(12) United States Patent
Files et al.

(10) Patent No.: US 10,666,078 B2
(45) Date of Patent: May 26, 2020

(54) SYSTEM AND METHOD OF MANAGING BATTERY SYSTEMS

(71) Applicant: Dell Products L.P., Round Rock, TX (US)

(72) Inventors: Jace William Files, Round Rock, TX (US); John Trevor Morrison, Round Rock, TX (US); Gerald Rene Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 129 days.

(21) Appl. No.: 16/036,555

(22) Filed: Jul. 16, 2018

(65) Prior Publication Data
US 2020/0021115 A1    Jan. 16, 2020

(51) Int. Cl.
*H02J 7/00*     (2006.01)
*G06F 1/18*     (2006.01)
*G06F 1/26*     (2006.01)
*G06F 1/16*     (2006.01)

(52) U.S. Cl.
CPC ............ *H02J 7/007* (2013.01); *G06F 1/1618* (2013.01); *G06F 1/189* (2013.01); *G06F 1/263* (2013.01); *H02J 7/0021* (2013.01); *G06F 1/1605* (2013.01); *G06F 1/188* (2013.01)

(58) Field of Classification Search
CPC ........ H02J 7/007; G06F 1/1618; G06F 1/189; G06F 1/263; G06F 3/0673
See application file for complete search history.

(56) References Cited

U.S. PATENT DOCUMENTS

| | | | |
|---|---|---|---|
| 9,606,664 B2 | 3/2017 | Knepper et al. | |
| 2002/0175658 A1* | 11/2002 | Watts | H02J 7/0091 320/150 |
| 2004/0257089 A1* | 12/2004 | Aridome | H01M 10/486 324/430 |
| 2012/0176080 A1* | 7/2012 | Uchihashi | A62C 3/16 320/101 |
| 2018/0252774 A1* | 9/2018 | Ciaccio | H01M 10/4207 |

* cited by examiner

*Primary Examiner* — Terrell S Johnson
(74) *Attorney, Agent, or Firm* — Baker Botts L.L.P.

(57) ABSTRACT

In one or more embodiments, one or more systems, methods, and/or processes may determine a temperature change associated with a first battery system; may determine if a temperature change is increasing; if the temperature change associated with the first battery is increasing: may determine if the temperature change is above a maximum threshold; if the temperature change is not above the maximum threshold, may charge the first battery system; if the temperature change is above the maximum threshold: may determine that a second battery system is fully charged; and may charge the first battery system at a reduced charge rate; and if the temperature change is not increasing: may determine if the temperature change is above a minimum threshold; if the temperature change is above the minimum threshold, may charge the first battery; and if the temperature change is not above the minimum threshold, may charge the second battery system.

20 Claims, 17 Drawing Sheets

SYSTEM AND METHOD OF MANAGING BATTERY SYSTEMS

BACKGROUND

Field of the Disclosure

This disclosure relates generally to information handling systems and more particularly to managing battery charging and battery discharging in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine a first temperature measurement associated with the first battery system; may, after a period of time transpires, determine a second temperature measurement associated with the first battery system; may determine, from the first temperature measurement and the second temperature measurement, a temperature change associated with the first battery system; may determine if the temperature change is increasing; if the temperature change is increasing: may determine if the temperature change is above a maximum threshold; if the temperature change is not above the maximum threshold, may charge the first battery system; and if the temperature change is above the maximum threshold: may determine that a second battery system is fully charged; and may charge the first battery system at a reduced charge rate; and if the temperature change is not increasing: may determine if the temperature change is above a minimum threshold; if the temperature change is above the minimum threshold, may charge the first battery; and if the temperature change is not above the minimum threshold, may charge the second battery system. In one or more embodiments, the one or more systems, methods, and/or processes may further determine the reduced charge rate based at least on the temperature change and the second temperature measurement.

In one or more embodiments, the information handling system may include one or more housings. In one example, a first portion of the information handling system of the multiple portions of the information handling system may include the first battery system. For instance, a first housing of the one or more housings may include the first portion of the information handling system. In a second example, a second portion of the information handling system of the multiple portions of the information handling system may include the second battery system. For instance, a second housing of the one or more housings may include the second portion of the information handling system. In one or more embodiments, the information handling system may include one or more displays. For example, each of the one or more housings may include a respective display of the one or more displays In one or more embodiments, the information handling system may include an embedded controller. In one or more embodiments, the information handling system may include one or more sensors. For example, a sensor of the one or more sensors may provide the first temperature measurement and the second temperature measurement to the embedded controller. For instance, the sensor or the one or more sensors may provide the first temperature measurement and the second temperature measurement to the embedded controller via a sensor hub. In one or more embodiments, the sensor of the one or more sensors may be proximate to the first battery system, may be in contact with the first battery system, or may be included by the first battery system.

In one or more embodiments, the one or more systems, methods, and/or processes may further determine that the first battery system is not charging; may further determine a temperature associated with the second battery system; if the temperature associated with the second battery system is above the minimum temperature, may further permit the second battery system to provide power to one or more components of the information handling system; and if the temperature associated with the second battery system is not above the minimum temperature, may further permit the first battery system to provide power to the one or more components of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
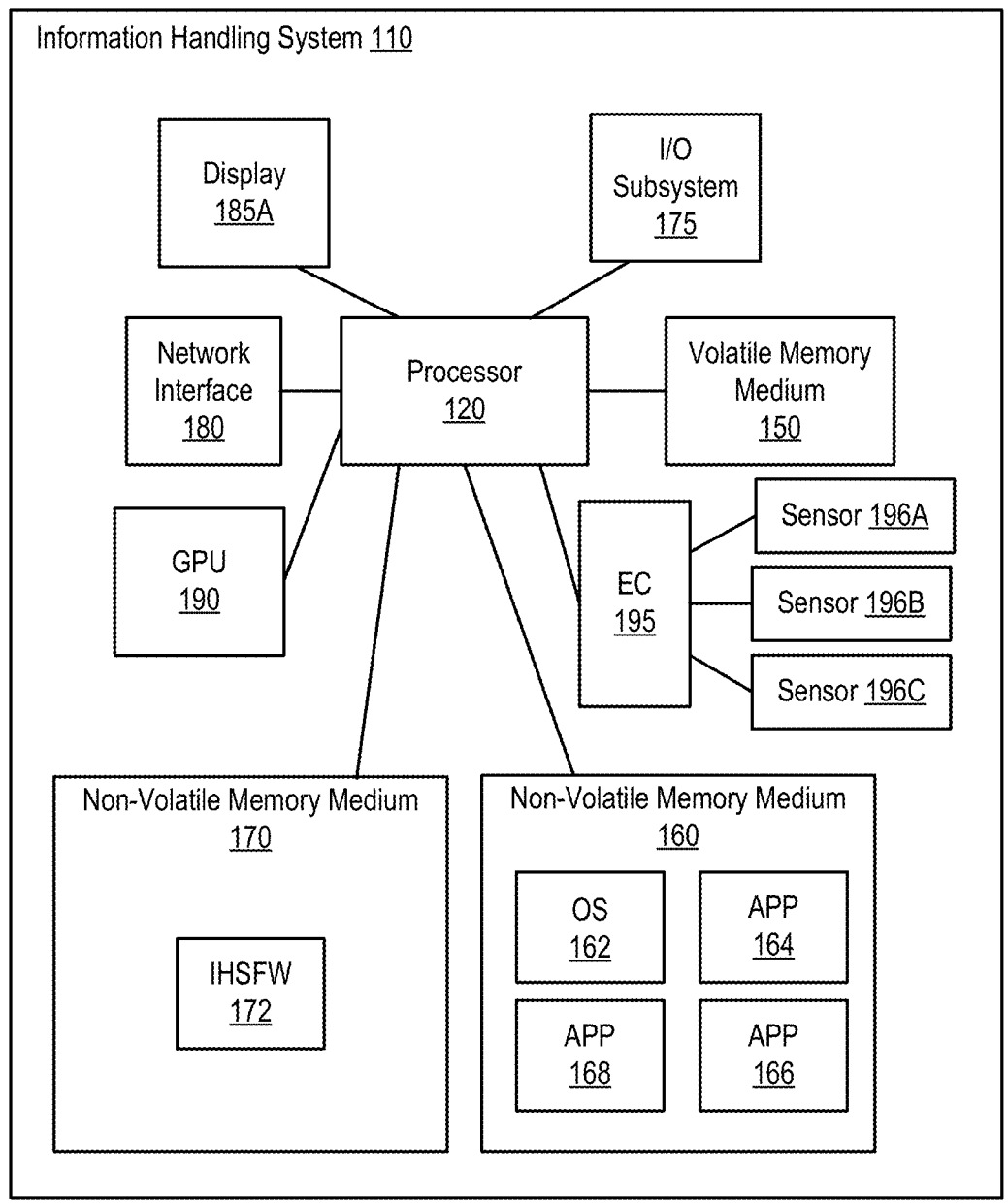
FIGS. 1A and 1B illustrate examples of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include one or more elements that generate heat. In one or more embodiments, one or more thermal specifications may be utilized in determining a temperature that is appropriate for a surface of information handling system that may contact a user. In one example, a maximum temperature for a glass portion of the information handling system that may contact the user may be twenty-two degrees Celsius (22° C.) above an ambient temperature. For instance, an ambient temperature may be or may be around twenty-eight degrees Celsius (28° C.). In a second example, a maximum temperature for a metallic portion of the information handling system that may contact the user may be eleven degrees Celsius (11° C.) above an ambient temperature. For instance, an ambient temperature may be or may be around twenty-eight degrees Celsius (28° C.). In another example, a maximum temperature for a plastic portion of the information handling system that may contact the user may be twelve degrees Celsius (12° C.) above an ambient temperature. For instance, an ambient temperature may be or may be around twenty-eight degrees Celsius (28° C.).

In one or more embodiments, a user may rest a portion of his or her body against an information handling system when utilizing the information handling system. In one example, the user may rest one or more of a hand, a palm of the hand, and one or more fingers of the hand against the information handling system while interacting with the information handling system. In another example, the user may rest a forearm against the information handling system while interacting with the information handling system. In one or more embodiments, an information handling system may include one or more displays. For example, the user may contact a portion of his or her body with the one or more displays of the information handling system. For instance, a surface of a display of the information handling system may include one or more of glass and plastic, and if one or more temperatures of the surface, contacting the user, are not below a threshold temperature, a user experience may be less than optimal or may be a poor user experience. In one or more embodiments, controlling one or more temperatures of one or more portions of an information handling system that may contact a user of the information handling system may provide one or more advantages. For example, the one or more advantages may include one or more of a good user experience, faster processing of information, longer battery system life, and better utilization of multiple displays, among others.

In one or more embodiments, distributing one or more of power and processing through the information handling system may include determining how the information handling system is being utilized. For example, determining how the information handling system is being utilized may include determining one or more applications (e.g., one or more of a drawing application, an image processing application, a word processing application, a computer-aided design (CAD) application, a mathematics application (e.g., Mathematica, MathCAD, etc.), a video processing application, and a sound processing application, among others) that are executing and/or being utilized by the user. In one instance, the information handling system may determine if an on-screen keyboard is being utilized by the user. In a second instance, the information handling system may determine if an external mouse and/or keyboard is communicatively coupled to the information handling system. In a third instance, the information handling system may determine an orientation of the information handling system and/or one or more orientation of one or more displays of the information handling system. In another instance, the information handling system may determine if a stylus is utilized by the user. In one or more embodiments, the information handling system may determine an operating mode of the information handling system. For example, an operating mode of the information handling system may include a laptop mode (e.g., one display that outputs information from an application and another display that receives user input, such as a keyboard), a dual screen on a dock (e.g., multiple displays coupled to a docking station and/or at an angle), dual display on a surface (e.g., multiple displays are "face up" on a table/desk/etc.).

In one or more embodiments, the information handling system may determine one or more modes, methods, and/or processes in controlling and/or handling thermal aspects, processing distribution, battery system charging, battery system discharging, and/or power distribution based at least on various determinations. In one or more embodiments, the information handling system may adjust, control, and/or handle one or more thermal aspects of the information handling system based at least on a portion of a user in contact with the information handling system. In one example, processing may be migrated from a first portion of the information handling system to a second portion, different from the first portion, of the information handling system. For instance, with an information handling system that includes multiple displays, processing may be migrated from a first processor associated with a first display of the multiple displays to a second processor associated with a second display of the multiple displays. In another example, processing may be boosted. In one or more embodiments, if processing was migrated from a first portion of the information handling system to a second portion, different from the first portion, of the information handling system, processing may be migrated back to the first portion of the information handling system. In one or more embodiments, if processing was migrated from a first portion of the information handling system to a second portion, different from the first portion, of the information handling system, processing may be augmented by the first portion of the information handling system. Further information about thermal management of information handling systems is disclosed in U.S. patent application Ser. No. 15/911,879, filed 5 Mar. 2018, and titled "System and Method of Thermal Management of Information Handling Systems", which is hereby incorporated by reference.

In one or more embodiments, an information handling system may include multiple battery systems. In one or more embodiments, battery system charging may be migrated from a first portion of the information handling system to another portion of the information handling system. For example, one or more of the multiple battery systems may generate heat. In one instance, one or more of the multiple battery systems may generate heat while being charged. In another instance, one or more of the multiple battery systems may generate heat while being discharged. In one or more embodiments, utilizing multiple battery systems may create one or more scenarios where one or more thermal specifications may initially conflicted with but may not conflicted with one or more absolute thermal thresholds. For example, one or more thermal deltas between two portions of an information handling system may not be conflicted with.

In one or more embodiments, an information handling system may receive power from an external power source. For example, the information handling system may receive power from an external power supply. In one or more embodiments, when an information handling system is receiving power from an external power source, performance of the information handling system may decrease from an increased thermal load of a battery system, as circuitry of the information handling system may reduce power to other one or more components of the information handling system. For example, reducing power to the one or more components of the information handling system may reduce one or more processing capabilities of the information handling system. For instance, one or more of a processor, a graphics processing unit, and a storage device, among others, of the information handling system may utilize a slower clock speed to reduce power consumption.

In one or more embodiments, heat may be associated with charging and/or discharging a battery system. For example, charging a battery system may be ninety percent (90%) efficient. For example, if fifteen watts (15 W) is applied to charging the battery system, up to 1.5 watts (1.5 W) may be dissipated as heat. In one or more embodiments, multiple battery systems of an information handling system may be distributed to multiple portions of the information handling system. For example, utilizing the multiple battery systems at the multiple portions of the information handling system may mitigate infringing one or more thermal specifications. For instance, charging or discharging a first battery system of the multiple battery systems at a first portion of the information handling system may be switched to charging or discharging a second battery system of the multiple battery systems at a second portion of the information handling system if a temperature difference associated with the first battery system and the second battery system is above a threshold.

In one or more embodiments, heat may shorten a lifespan of a battery system. For example, heat may degrade one or more chemistries and/or one or more structures of a battery system. In one or more embodiments, reducing heat associated with a battery system may aid in abridging a shortened lifespan of a battery system associated with heat. In one example, if a battery system is associated with a maximum temperature threshold, the battery system may not be utilized until a temperature associated with the battery system is below the maximum temperature threshold or is below the maximum temperature threshold by a number of degrees. In another example, if a battery system is associated with a maximum temperature threshold, the battery system may not be utilized until a temperature associated with the battery system is below the maximum temperature threshold or is below the maximum temperature for an amount of time.

Figure 1B:
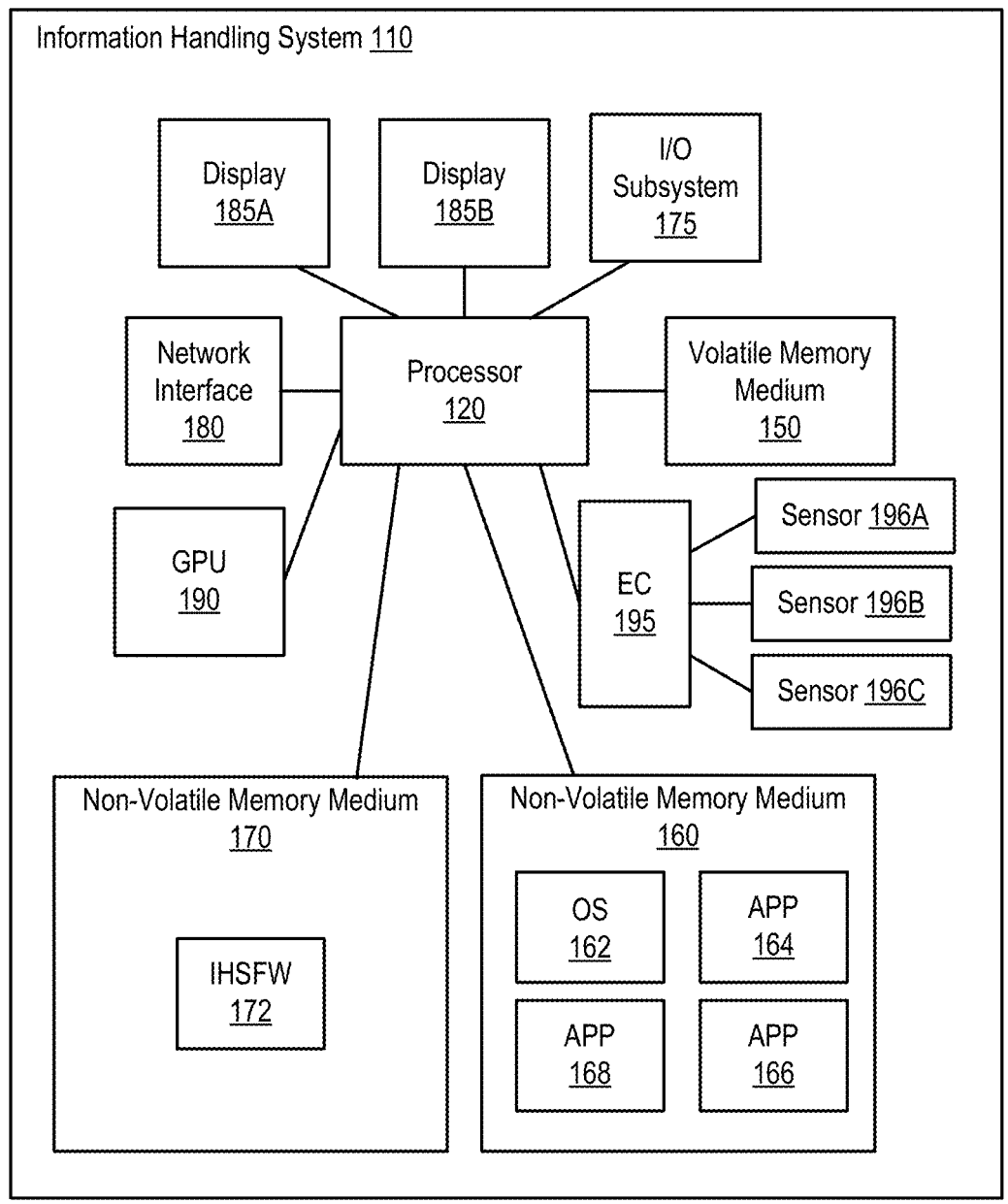

Turning now to FIGS. 1A and 1B, examples of an information handling system are illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown in FIG. 1A, IHS 110 may include a processor 120, a volatile memory medium 150, non-volatile memory media 160 and 170, an I/O subsystem 175, a network interface 180, a display 185A, a graphics processing unit (GPU) 190, and an embedded controller (EC) 195. In one or more embodiments, GPU 190 may be or include a discrete GPU (dGPU). As illustrated, volatile memory medium 150, non-volatile memory media 160 and 170, I/O subsystem 175, network interface 180, display 185A, GPU 190, and EC 195 may be communicatively coupled to processor 120. As shown FIG. 1B, IHS 110 may include processor 120, volatile memory medium 150, non-volatile memory media 160 and 170, I/O subsystem 175, network interface 180, displays 185A and 185B, GPU 190, and EC 195. As illustrated, volatile memory medium 150, non-volatile memory media 160 and 170, I/O subsystem 175, network interface 180, displays 185A and 185B, and GPU 190 may be communicatively coupled to processor 120.

As shown, sensors 196A-196C may be coupled to EC 195. In one or more embodiments, a sensor 196 may sample physical phenomena and provide data associated with the physical phenomena to EC 195. In one example, sensor 196 may determine a temperature. For instance, sensor 196 may provide data associated with the temperature to EC 195. In a second example, sensor 196 may determine an acceleration. For instance, sensor 196 may provide data associated with the acceleration to EC 195. In another example, sensor 196 may determine a magnetic field. For instance, sensor 196 may provide data associated with the magnetic field to EC 195. In one or more embodiments, sensors 196A-196C may be distributed in a housing of IHS 110. Although not specifically illustrated, sensor 196 may provide data to EC 195 via a sensor hub, according to one or more embodiments.

In one or more embodiments, one or more of volatile memory medium 150, non-volatile memory media 160 and 170, I/O subsystem 175, network interface 180, GPU 190, and EC 195 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
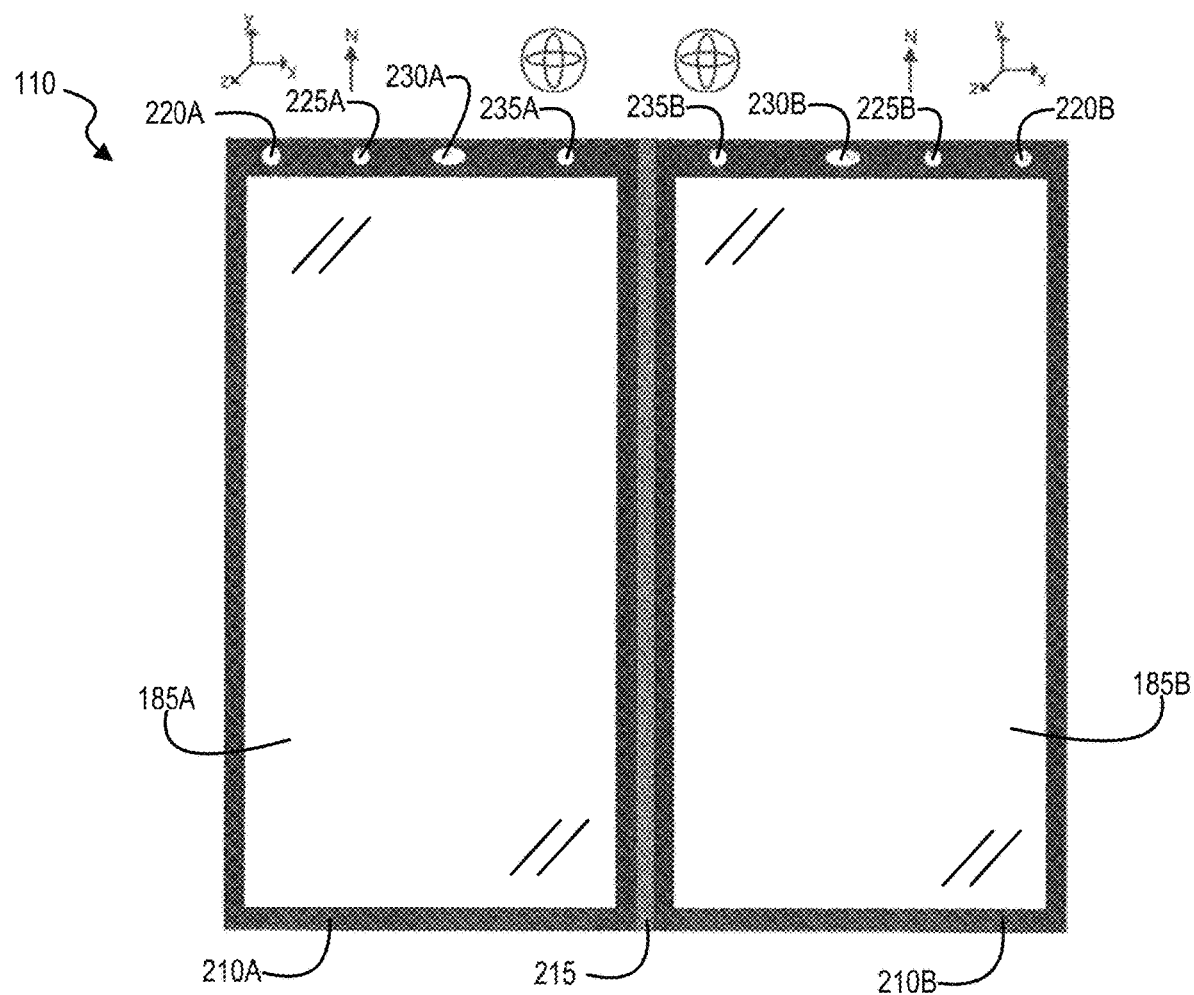
FIG. 2A illustrates an example of an information handling system that includes multiple displays, according to one or more embodiments.

Turning now to FIG. 2A, an example of an information handling system that includes multiple displays is illustrated, according to one or more embodiments. As shown, IHS 110 may include housings 210A and 210B. In one or more embodiments, housings 210A and 210B may be joined via a hinge mechanism 215. As illustrated, housing 210A may include one or more of display 185A, an orientation sensor 220A, a directional sensor 225A, a camera 230A, and a gyroscopic sensor 235B. Although not specifically illustrated, one or more of orientation sensor 220A, directional sensor 225A, camera 230A, and gyroscopic sensor 235A may be communicatively coupled to processor 120 and/or EC 195, according to one or more embodiments.

As shown, housing 210B may include one or more of display 185B, an orientation sensor 220B, a directional sensor 225B, a camera 230B, and a gyroscopic sensor 235B. Although not specifically illustrated, one or more of orientation sensor 220B, directional sensor 225B, camera 230B, and gyroscopic sensor 235B may be communicatively coupled to processor 120, according to one or more embodiments. In one or more embodiments, one or more of housings 210A and 210B may operate to provide information to a user of IHS 110. In one example, display 185A may provide information in association with display 185B. In a second example, display 185A may provide information that is not associated with display 185B. In another example, one of display displays 285A and 285B may provide information while the other display may be blank, as needed and/or desired.

In one or more embodiments, displays 285A and 285B may represent combined input/output devices for IHS 110. For example, displays 285A and 285B may be or include respective touch-screen displays, that operate to display and/or receive information associated with respective housings 210A and 210B. In one or more embodiments, each of one or more of displays 285A and 285B may display a keyboard interface and receive touch-based keyboard inputs. In one or more embodiments, each of one or more of displays 285A and 285B may include a gesture-enabled display device that is configured to detect the motion of a touch over a surface the display. In one or more embodiments, each of one or more of displays 285A and 285B may include a multi-touch-enabled display device that is configured to detect two or more simultaneous touch contacts on the surface of the display. In one or more embodiments, each of one or more of displays 285A and 285B may include a hover-sensitive display device that is configured to detect a presence of a touch device and/or a portion of a user hovering in proximity over the surface of the display.

In one or more embodiments, processor 120 may receive information from one or more of orientation sensors 220A and 220B, directional sensors 225A and 225B, cameras 230A and 230B, and gyroscopic sensors 235A and 235B, among others. In one or more embodiments, one or more of orientation sensors 220A and 220B, directional sensors 225A and 225B, and gyroscopic sensors 235A and 235B, among others, may be utilized in determining an orientation in space of respective housings 210A and 210B, based at least on a three-dimensional coordinate system.

In one example, one or more of orientation sensor 220A, directional sensor 225A, and gyroscopic sensor 235A, among others, may be utilized in determining that housing 210A is oriented horizontally, vertically with a bottom parallel to the ground, vertically with a side parallel to the ground, and/or in an intermediate orientation, among others. In another example, one or more of orientation sensor 220B, directional sensor 225B, and gyroscopic sensor 235B, among others, may be utilized in determining that housing 210B is oriented horizontally, vertically with a bottom parallel to the ground, vertically with a side parallel to the ground, and/or in an intermediate orientation, among others.

In one or more embodiments, one or more of directional sensors 225A and 225B may be configured to determine an orientation with respect to magnetic north of a major axis to one or more of housings 210A and 210B. For example, where housing 210A is oriented horizontally, direction sensor 225A may be utilized in determining a compass bearing of a line oriented along a side of the housing. For instance, one or more of directional sensors 225A and 225B may include one or more magnetometers and/or one or more accelerometers, among others.

In one or more embodiments, one or more of cameras 230A and 230B may be configured to receive photonic input. For example, one or more of cameras 230A and 230B may be utilized to receive light input and provide one or more of still images and/or one or more videos. In one or more embodiments, one or more of cameras 230A and 230B may be utilized in determining motion and/or presence of a pointing device and/or a user in proximity to one or more of housings 210A and 210B, among others. In one or more embodiments, one or more of cameras 230A and 230B may be utilized in determining a direction of a glance of a user of IHS 110. In one example, camera 230A may be utilized in determining if a user is looking at the top-left corner of housing 210A and/or in determining if the user is looking at a bottom-right corner of housing 210A. In another example, one or more of cameras 230A and 230B may be utilized in following a glance of the user, as the glance moves across one or more of housing 210A and 210B.

In one or more embodiments, one or more of gyroscopic sensors 235A and 235B may be utilized in determining a rotational motion of respective housings 210A and 210B and/or in determining one or more rates of rotational motion. In one or more embodiments, hinge mechanism 215 may coupled housings 210A and 210B. For example, hinge mechanism 215 may include a hinge that joins an edge of housing 210A to an edge of housing 210B. In one or more embodiments, hinge mechanism 215 may operate to permit housing 210A to swing to any angle between 0 and 360 degrees of arc with respect to housing 210B. As illustrated, IHS 110 is in an orientation where housing 210A is swung to a 180 degree angle with respect to housing 210B.

Figure 2B:
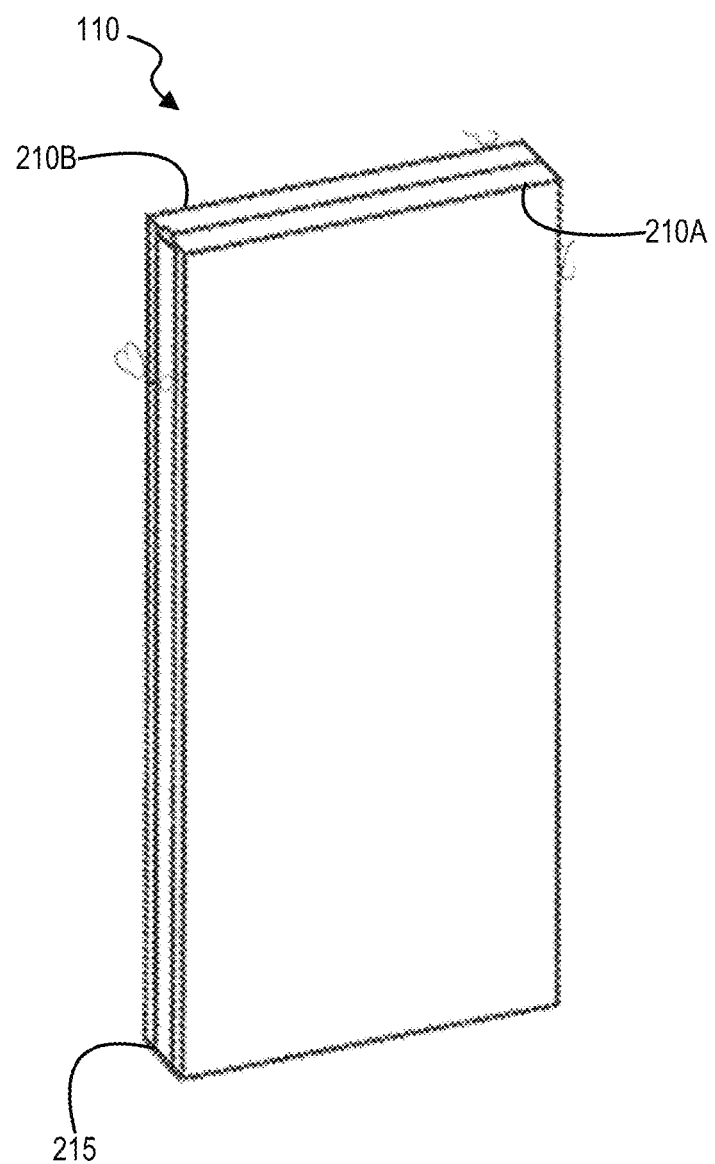
FIG. 2B illustrates an example of an information handling system that includes multiple displays, where an orientation of a first housing is swung to a 0 degree angle with respect to a second housing, according to one or more embodiments.

Turning now to FIG. 2B, an example of an information handling system that includes multiple displays, where an orientation of a first housing is swung to a 0 degree angle with respect to a second housing, is illustrated, according to one or more embodiments. As shown, IHS 110 is in a state that is normally associated as a "closed" state. In one or more embodiments, displays 185A and 185B may be facing each other in the "closed" state.

Figure 2C:
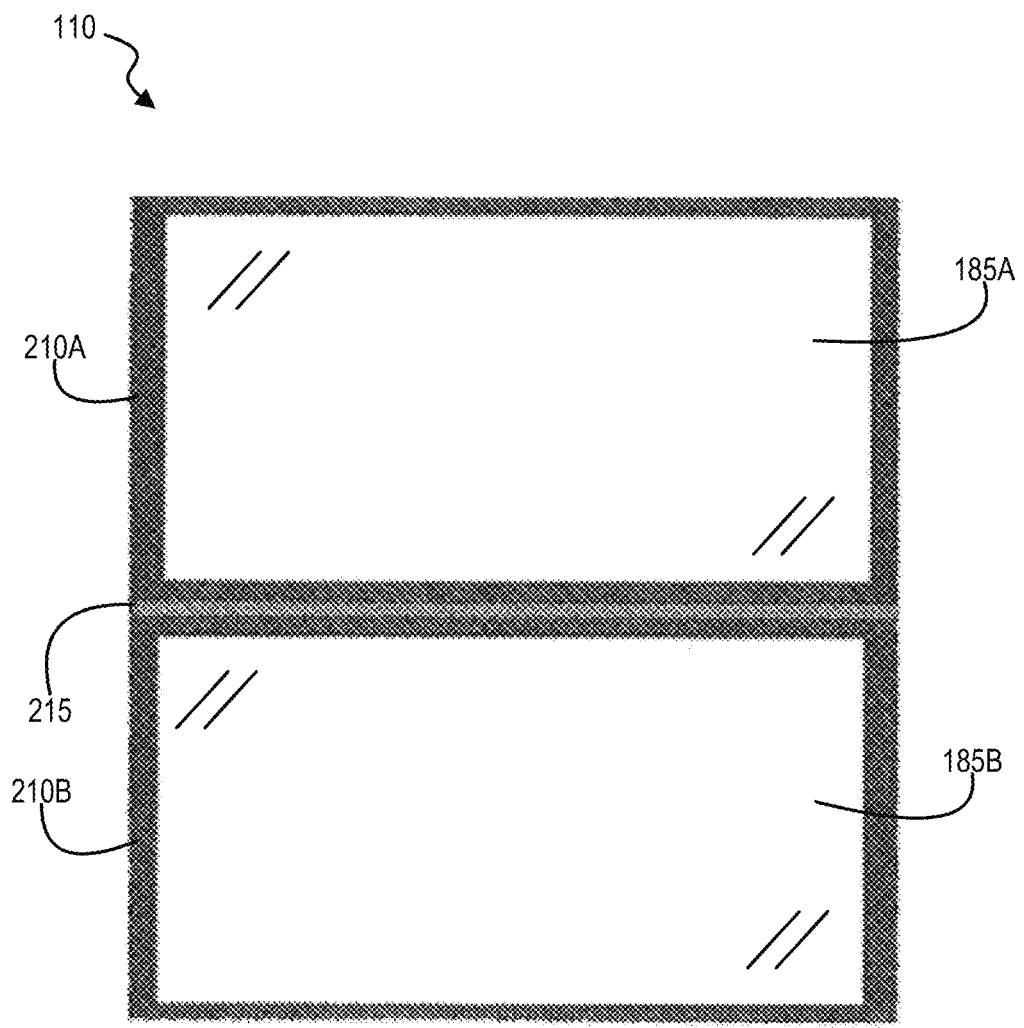
FIGS. 2C and 2D illustrate examples of an information handling system in a landscape orientation and in a portrait orientation, according to one or more embodiments.
Figure 2D:
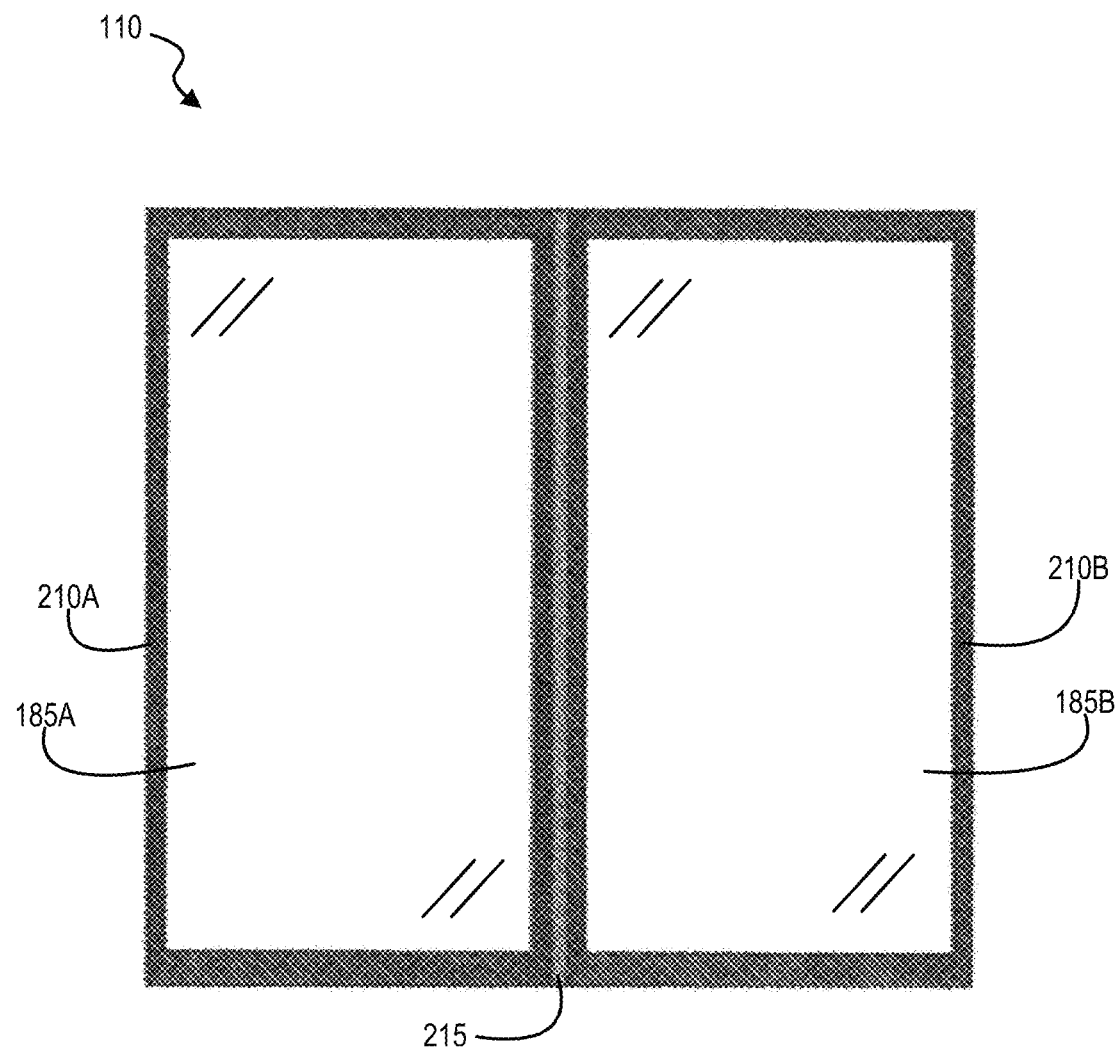

Turning now to FIGS. 2C and 2D, examples of an information handling system in a landscape orientation and in a portrait orientation are illustrated, according to one or more embodiments. As shown in FIG. 2C, IHS 110 may be in a landscape orientation. As illustrated in FIG. 2D, IHS 110 may be in a portrait orientation. In one or more embodiments, the portrait orientation and/or the landscape orientation may be with respect to the ground. In one or more embodiments, the portrait orientation and/or the landscape orientation may be with respect to a user.

Figure 2E:
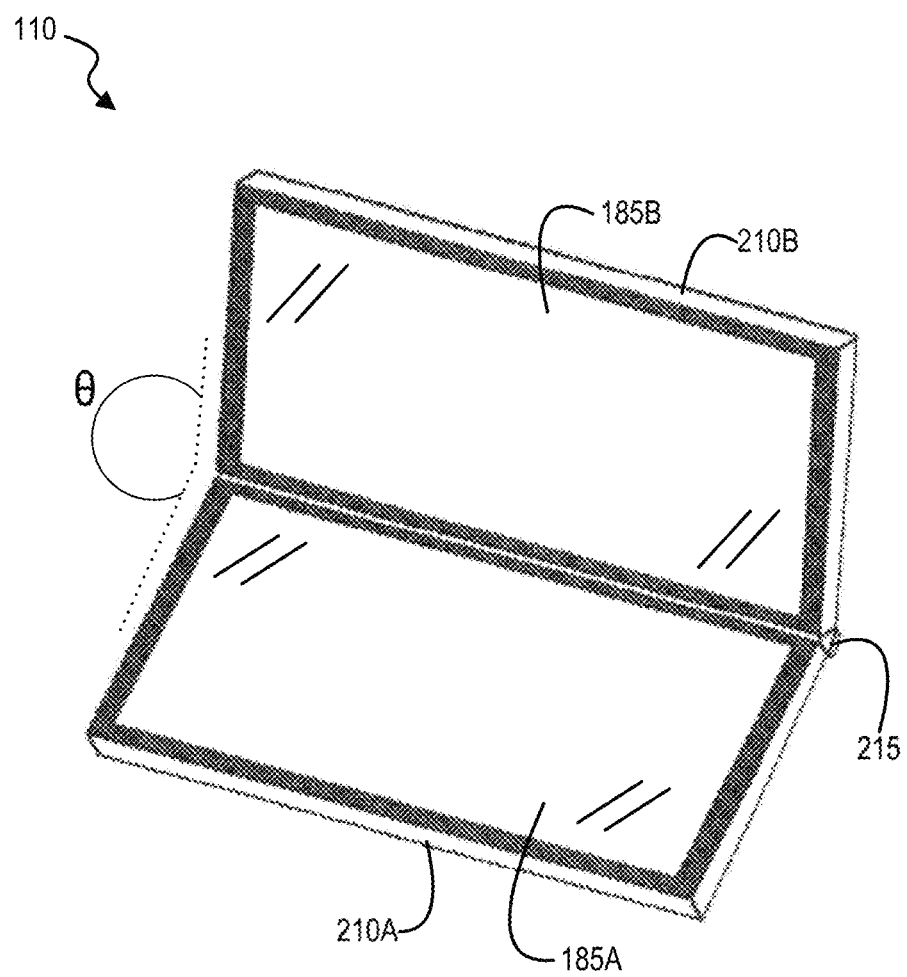
FIG. 2E illustrates an example of an information handling system in a "laptop" mode, according to one or more embodiments.

Turning now to FIG. 2E, an example of an information handling system in a "laptop" mode is illustrated, according to one or more embodiments. As shown, housing 210A may be at an angle θ to housing 210B. For example, θ may be greater than 0 degrees and less than 180 degrees.

Figure 2F:
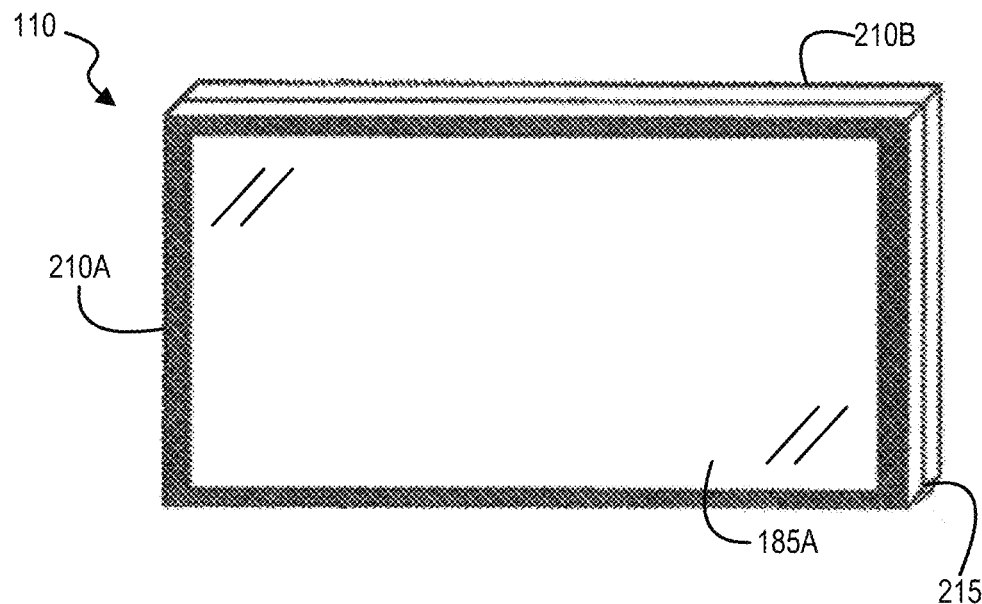
FIGS. 2F and 2G illustrate examples of an information handling system in a "360" degree mode, according to one or more embodiments.
Figure 2G:
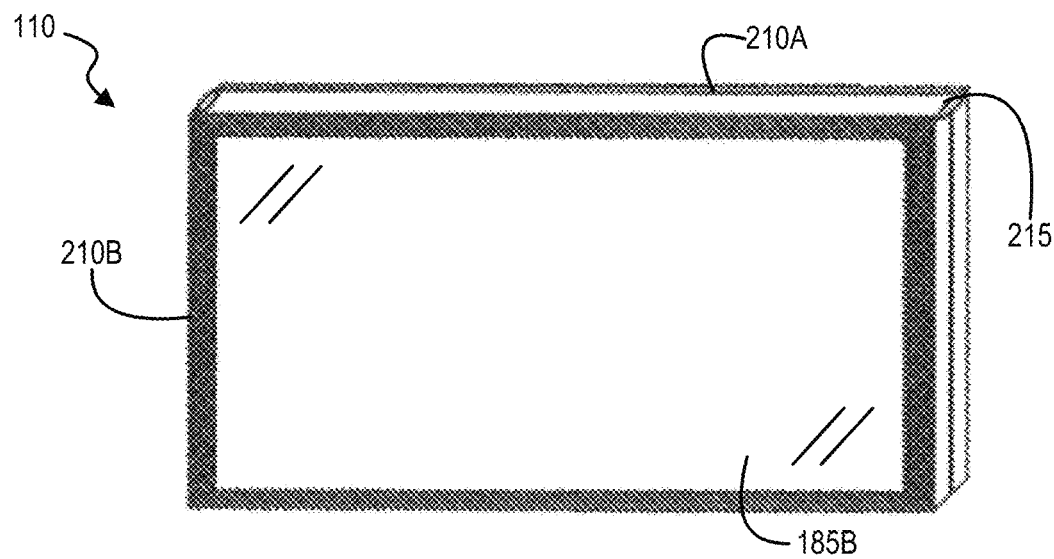

Turning now to FIGS. 2F and 2G, examples of an information handling system in a "360" degree mode are illustrated, according to one or more embodiments. As shown in FIGS. 2F and 2G, IHS 110 may be in a "360" degree mode. In one or more embodiments, the 360 degree mode may be utilized in a dual presentation. In one or more embodiments, the 360 degree mode may be utilized when a user utilizes one display. For example, one of displays 185A and 185B may be utilized, while the other display faces away from the user. For instance, the other display may be laying on a surface, a palm of a user, or a lap of the user, among others.

Figure 2H:
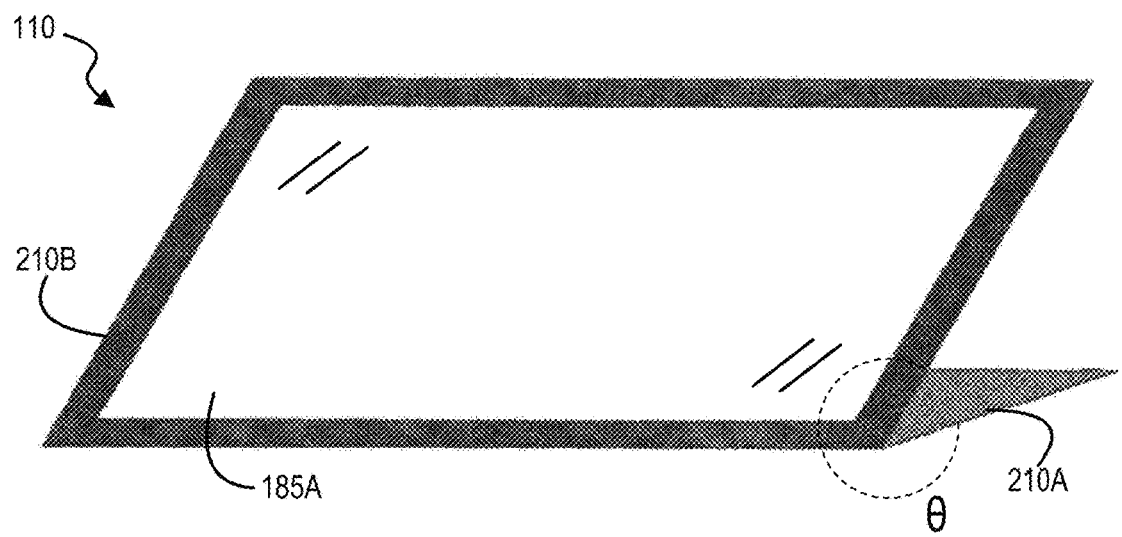
FIGS. 2H and 2I illustrate examples of an information handling system in multiple presentation modes, according to one or more embodiments.
Figure 2I:
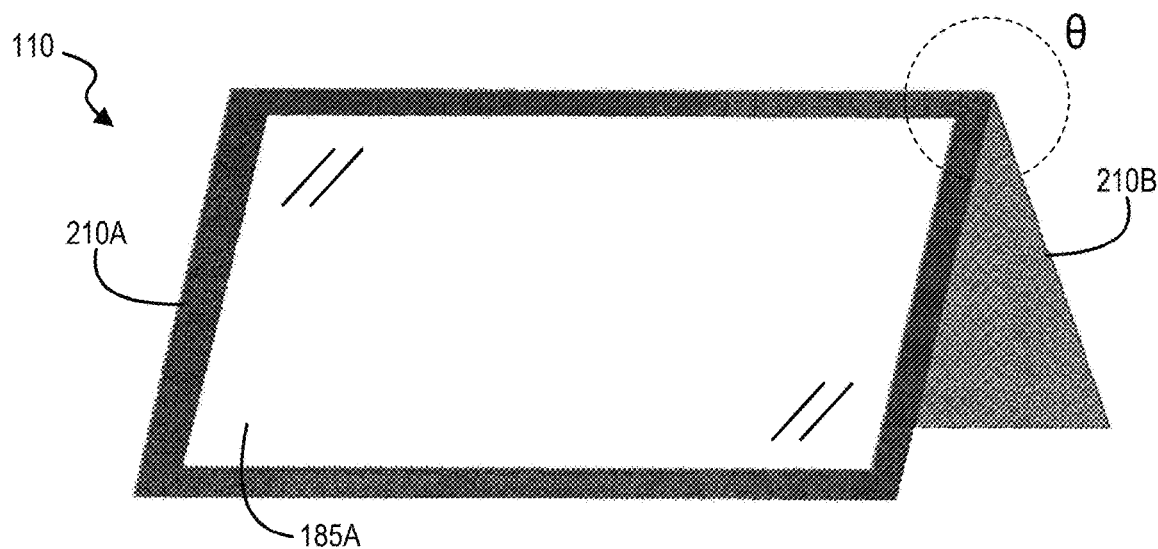

Turning now to FIGS. 2H and 2I, examples of an information handling system in multiple presentation modes are illustrated, according to one or more embodiments. As shown in FIGS. 2H and 2I, housing 210A may be at an angle θ to housing 210B. For example, θ may be greater than 180 degrees and less than 360 degrees. As illustrated, in FIG. 2H, IHS 110 may be in a single presentation mode. As shown in FIG. 2I, IHS 110 may be in a dual presentation mode. For instance, IHS 110 may be "tented".

Figure 2J:
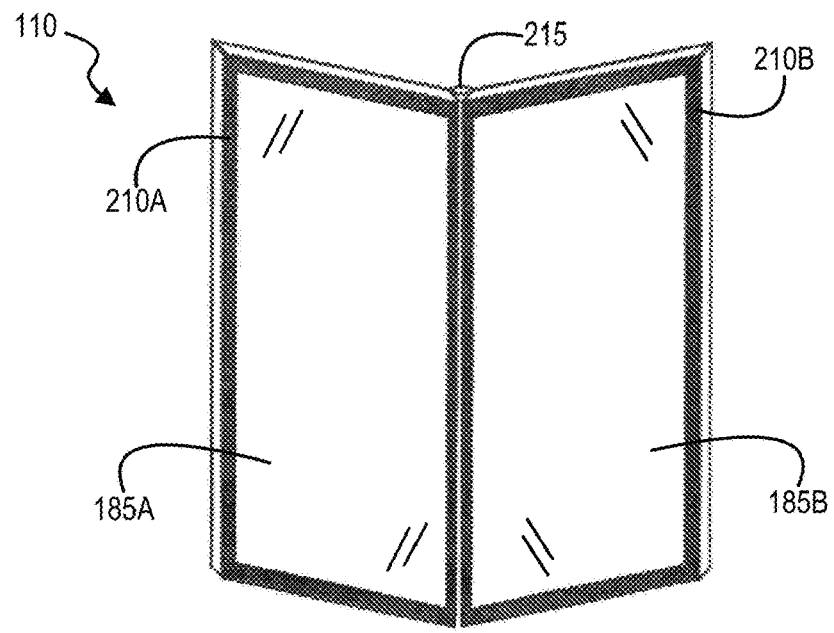
FIGS. 2J and 2K illustrate examples of an information handling system in multiple other presentation modes, according to one or more embodiments.
Figure 2K:
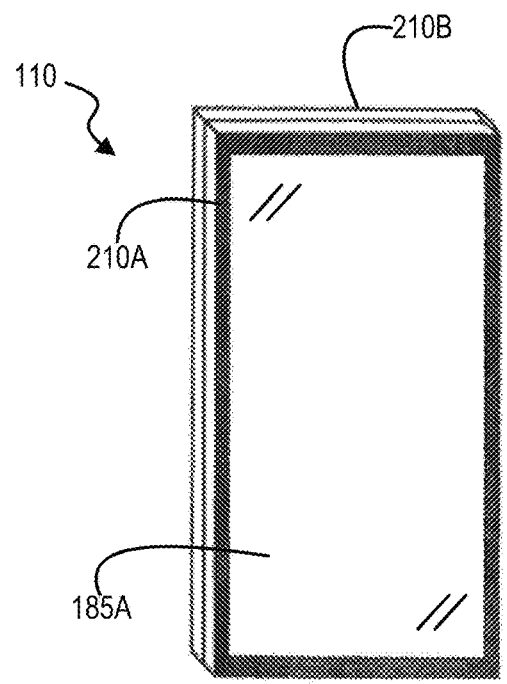

Turning now to FIGS. 2J and 2K, examples of an information handling system in multiple other presentation modes are illustrated, according to one or more embodiments. As shown in FIGS. 2J and 2K, IHS 110 may be in portrait modes. In one example in FIG. 2J, IHS 110 may be in portrait mode in FIG. 2J, and IHS 110 may be in a landscape mode in FIG. 2E. In another example, IHS 110 may be in portrait mode in FIG. 2K, and IHS 110 may be in a landscape mode in FIG. 2F.

Figure 2L:
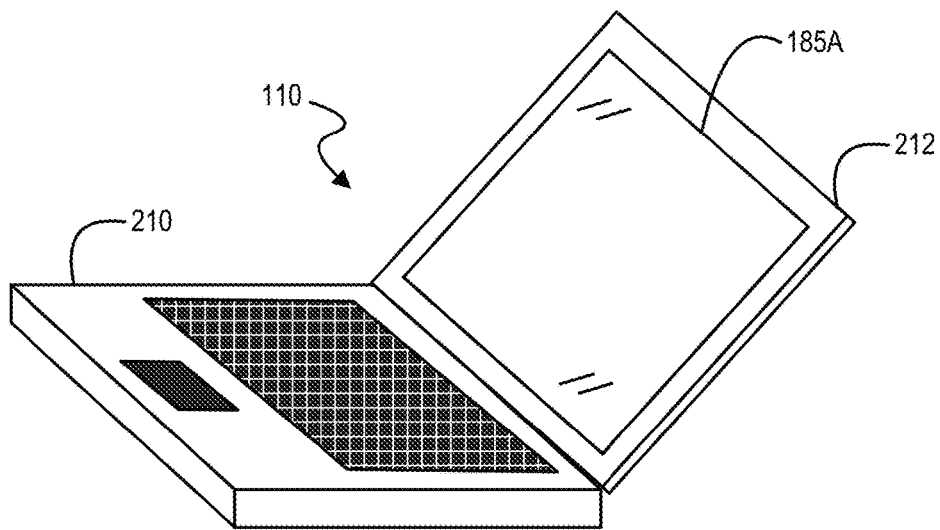
FIG. 2L illustrates an example of an information handling system that includes a housing and a lid, according to one or more embodiments.

Turning now to FIG. 2L, an example of an information handling system that includes a housing and a lid is illustrated, according to one or more embodiments. As shown, IHS 110 may include a housing 210. As illustrated, IHS 110 may include a lid 212. In one or more embodiments, lid 212 may be a housing of IHS 110. As shown, lid 212 may include display 185A.

Figure 3A:
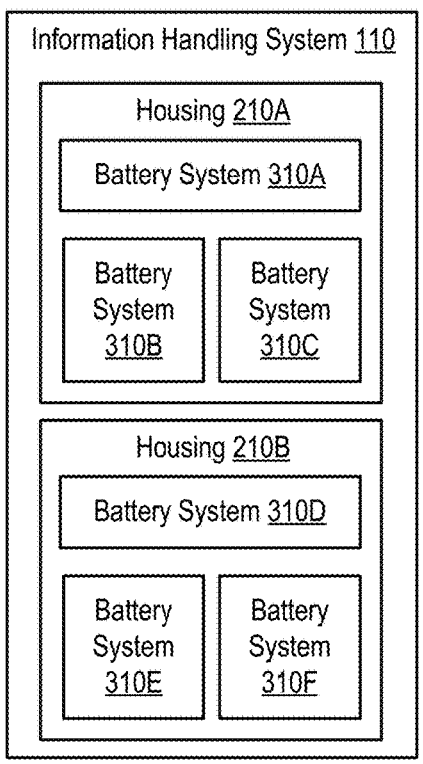
FIGS. 3A and 3B illustrates examples of an information handling system that includes multiple battery systems, according to one or more embodiments.
Figure 3B:
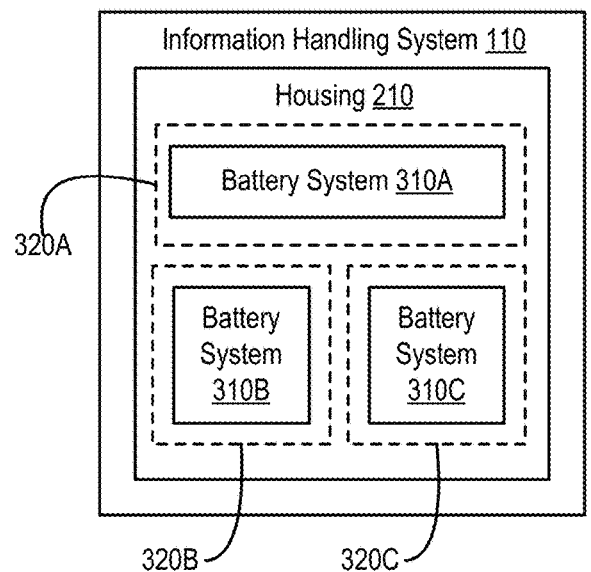

Turning now to FIGS. 3A and 3B, examples of an information handling system that includes multiple battery systems are illustrated, according to one or more embodiments. As shown, in FIG. 3A, housing 210A of IHS 110 may include battery systems 310A-310C. A illustrated in FIG. 3A, housing 210B of IHS 110 may include battery systems 310D-310F. As shown in FIG. 3B, housing 210 of IHS 110 may include battery systems 310A-310C. As illustrated in FIG. 3B, portions 320A-320C of IHS 110 and/or housing 210 may include respective battery systems 310A-310C. Although not specifically illustrated, portions of housing 210A may include respective battery systems 310A-310C, and/or portions of housing 210B may include respective battery systems 310D-310F, according to one or more embodiments.

Figure 4:
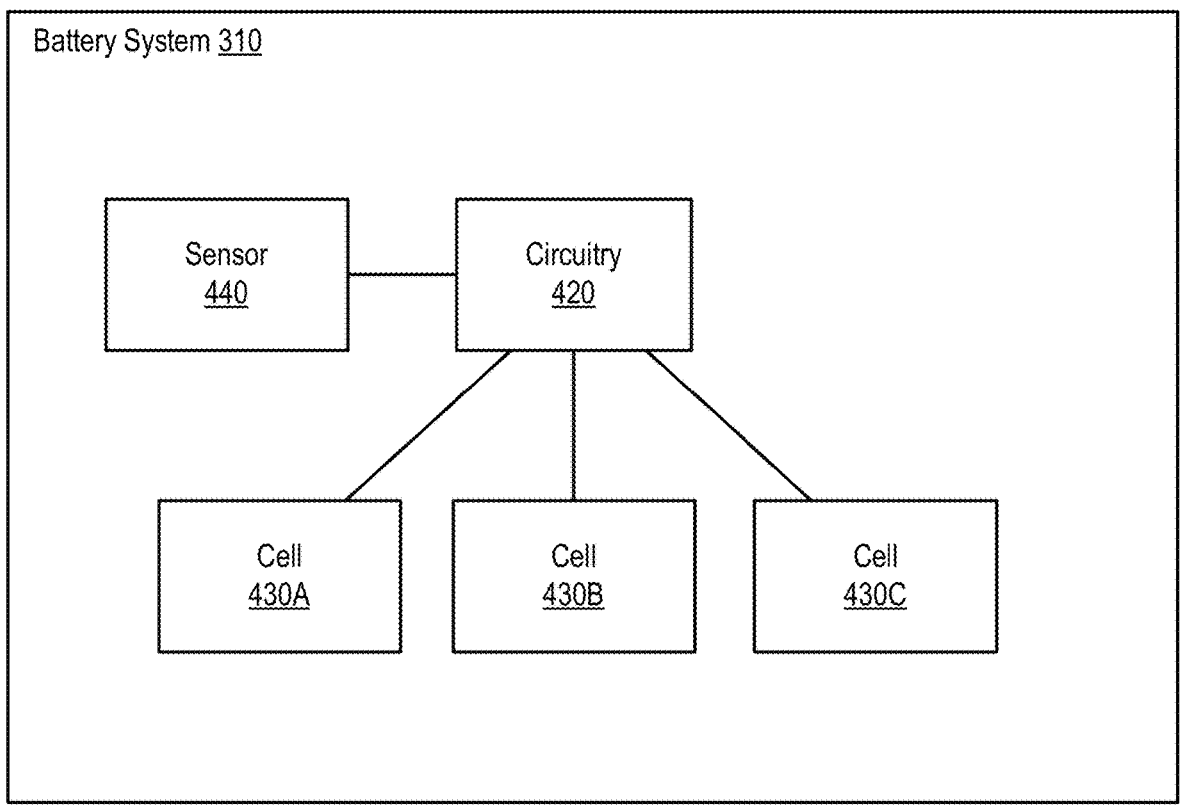
FIG. 4 illustrates a battery system, according to one or more embodiments.

Turning now to FIG. 4, a battery system is illustrated, according to one or more embodiments. As shown, battery system 310 may include circuitry 420 and cells 430A-430C (e.g., electrochemical cells, voltaic cells, etc.). In one example, battery system 310 may provide power to IHS 110. For instance, battery system 310 may provide power to one or more components of IHS 110. In a second example, battery system 310 may receive power from IHS 110. In another example, battery system 310 may communicate with IHS 110. As illustrated, battery system 310 may include a sensor 440. For example, sensor 440 may sense and/or determine one or more temperatures. As shown, sensor 440 may be coupled to circuitry 420. In one or more embodiments, sensor 440 may be or include sensor 196.

In one or more embodiments, circuitry 420 may regulate and/or monitor charging and/or discharging of battery system 310. In one example, circuitry 420 may regulate charging and/or discharging of one or more of cells 430A-430C. In a second example, circuitry 420 may monitor charging and/or discharging. In third example, circuitry 420 may include a processor that may store information associated with charging and/or discharging of battery system 310 and/or may provide the information associated with charging and/or discharging of battery system 310. For instance, the information associated with charging and/or discharging of battery system 310 may be provided, by circuitry 420, to one or more of processor 120 and EC 195, among others. In another example, circuitry 420 may include a processor that may store information associated with one or more temperatures of battery system 310 and/or may provide the information associated with the one or more temperatures of battery system 310. For instance, the information associated with the one or more temperatures of battery system 310 may be provided, by circuitry 420, to one or more of processor 120 and EC 195, among others.

Figure 5:
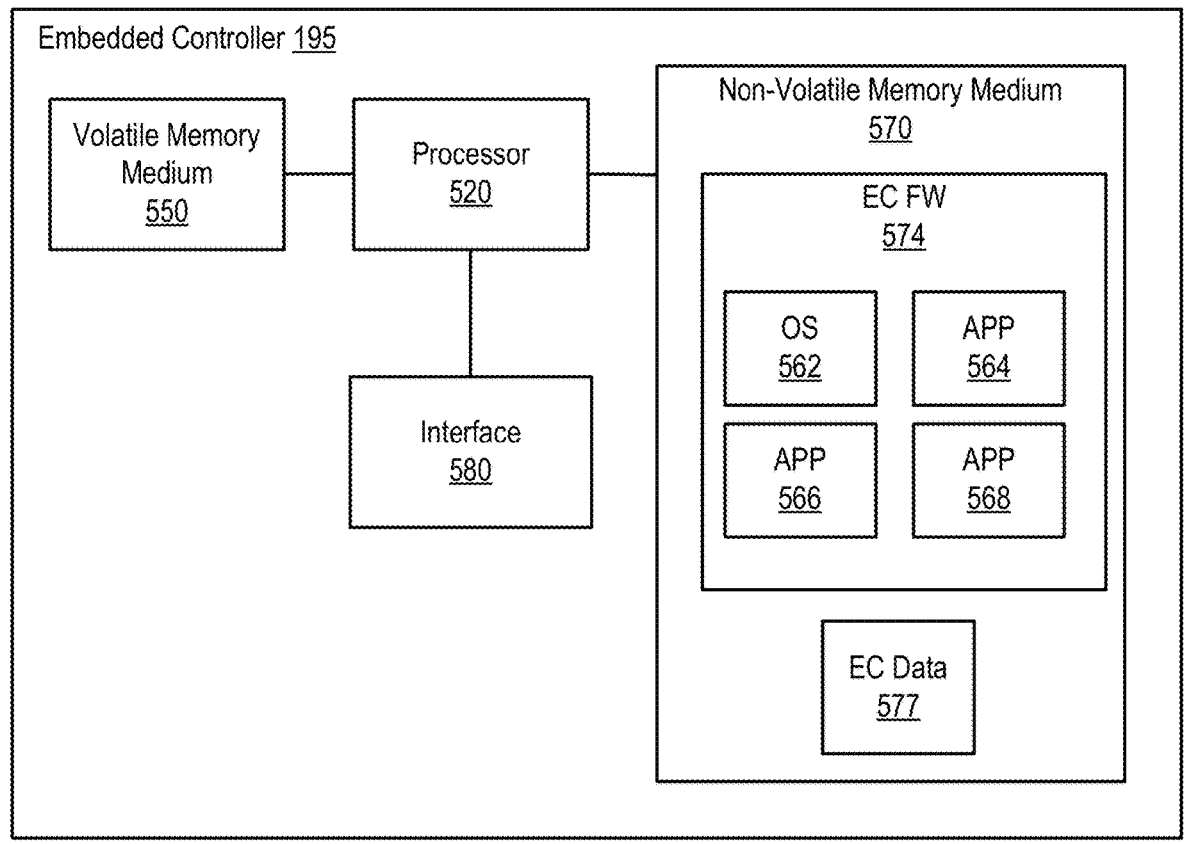
FIG. 5 illustrates an example embedded controller, according to one or more embodiments.

Turning now to FIG. 5, an example embedded controller is illustrated, according to one or more embodiments. As shown, EC 195 may include a processor 520, a volatile memory medium 550, a non-volatile memory medium 570, and an interface 580. As illustrated, non-volatile memory medium 574 may include an EC firmware (FW) 574, which may include an OS 562 and APPs 564-568, and may include EC data 577. For example, OS 562 may be or include a real-time operating system (RTOS).

In one or more embodiments, interface 580 may include circuitry that enables communicatively coupling to one or more devices. In one example, interface 580 may include circuitry that enables communicatively coupling to one or more buses. In a second example, interface 580 may include circuitry that enables one or more interrupt signals to be received. In one instance, interface 580 may include general purpose input/output (GPIO) circuitry, and the GPIO circuitry may enable one or more interrupt signals to be received and/or provided via at least one interrupt line. In another instance, interface 580 may include GPIO circuitry that may enable EC 195 to provide and/or receive signals associated with other circuitry. In a third example, interface 580 may include circuitry that enables communicatively coupling to one or more networks. In one instance, interface 580 may include circuitry that enables communicatively coupling to network interface 180. In another example, interface 580 may include a network interface.

In one or more embodiments, one or more of OS 562 and APPs 564-568 may include processor instructions executable by processor 520. In one example, processor 520 may execute processor instructions of one or more of OS 562 and APPs 564-568 via non-volatile memory medium 570. In another example, one or more portions of the processor instructions of the one or more of OS 562 and APPs 564-568 may be transferred to volatile memory medium 550, and processor 520 may execute the one or more portions of the processor instructions of the one or more of OS 562 and APPs 564-568 via volatile memory medium 550. In one or more embodiments, processor 520 may utilize EC data 577. In one example, processor 520 may utilize EC data 577 via non-volatile memory medium 570. In another example, one or more portions of EC data 577 may be transferred to volatile memory medium 550, and processor 520 may utilize EC data 577 via volatile memory medium 550. In one or more embodiments, processor 520 may execute processor instructions in implementing one or more systems, flowcharts, methods, and/or processes described herein. For example, processor 520 may execute processor instructions from one or more of memory media 550 and 570 in implementing one or more systems, flowcharts, methods, and/or processes described herein.

Figure 6A:
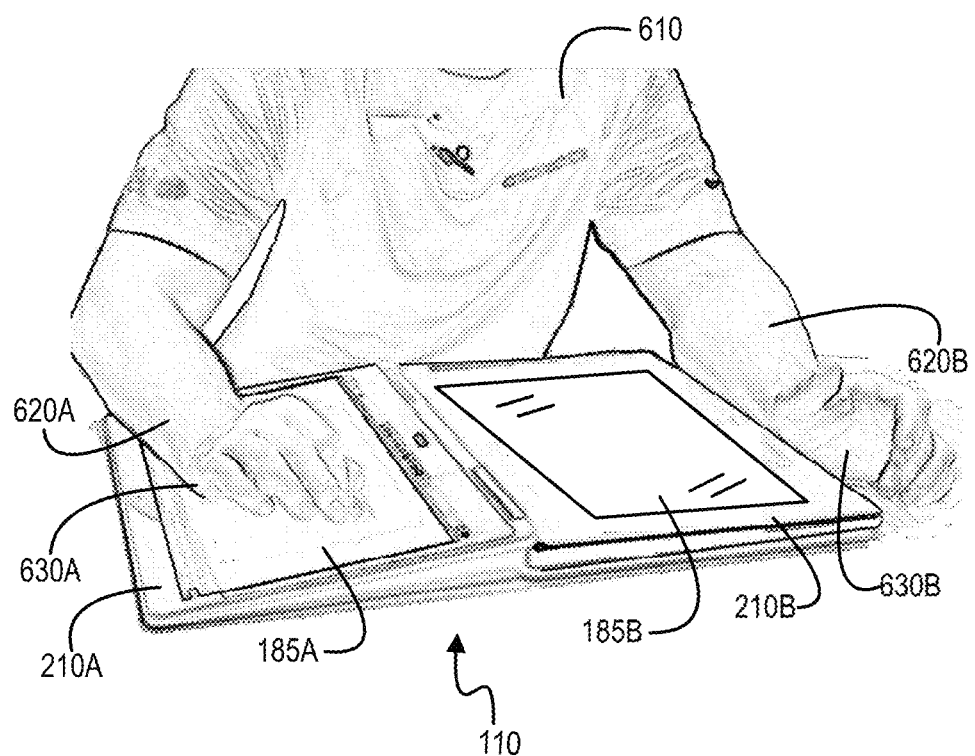
FIG. 6A illustrates an example of a user interacting with an information handling system, according to one or more embodiments.

Turning now to FIG. 6A, an example of a user interacting with an information handling system is illustrated, according to one or more embodiments. As shown, a user 610 may interact with IHS 110. In one or more embodiments, one or more portions of user 610 may be in contact with IHS 110. In one example, as illustrated, a forearm 620A of user 610 may be in contact with IHS 110. In another example, as shown, a forearm 620B of user 610 may not be in contact with IHS 110. As illustrated, forearm 620A of user 610 may be contact with one or more of housing 210A and display 185A.

In one or more embodiments, IHS 110 may determine that one or more portions of user 610 may be in contact with IHS 110. In one example, one or more touch-sensitive elements of IHS 110 may be utilized in determining if one or more portions of user 610 is in contact with IHS 110. In another example, one or more proximity-sensing elements of IHS 110 may be utilized in determining if one or more portions of user 610 is in contact with IHS 110.

Figure 6B:
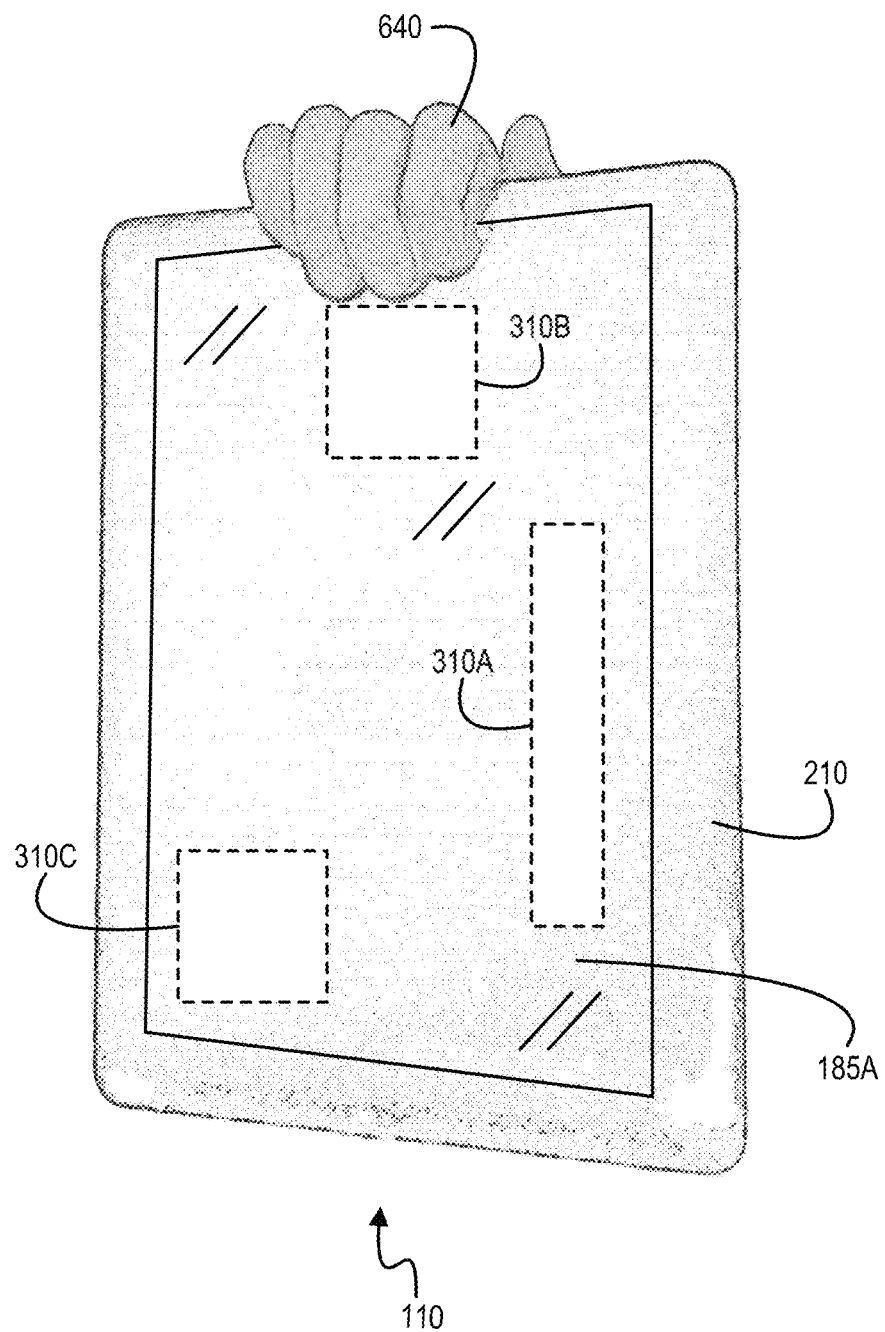
FIG. 6B illustrates an example of holding an information handling system, according to one or more embodiments.

Turning now to FIG. 6B, an example of holding an information handling system is illustrated, according to one or more embodiments. As shown, IHS 110 may be held by at least fingers 640 of a user. As illustrated, fingers 640 may contact display 185A. Although not specifically illustrated, a palm of the user may contact display 185B or housing 210. For example, the palm of the user may contact display 185B or housing 210 to hold IHS 110. In one instance, IHS 110 may include displays 185A and 185B, and the palm of the user may contact display 185B to hold IHS 110. In another instance, IHS 110 may be a tablet computing device, and the palm of the user may contact housing 210 to hold IHS 110. As shown, battery systems 310A-310C may be distributed within housing 210. For example, battery systems 310A-310C may be located behind display 185A.

Figure 7A:
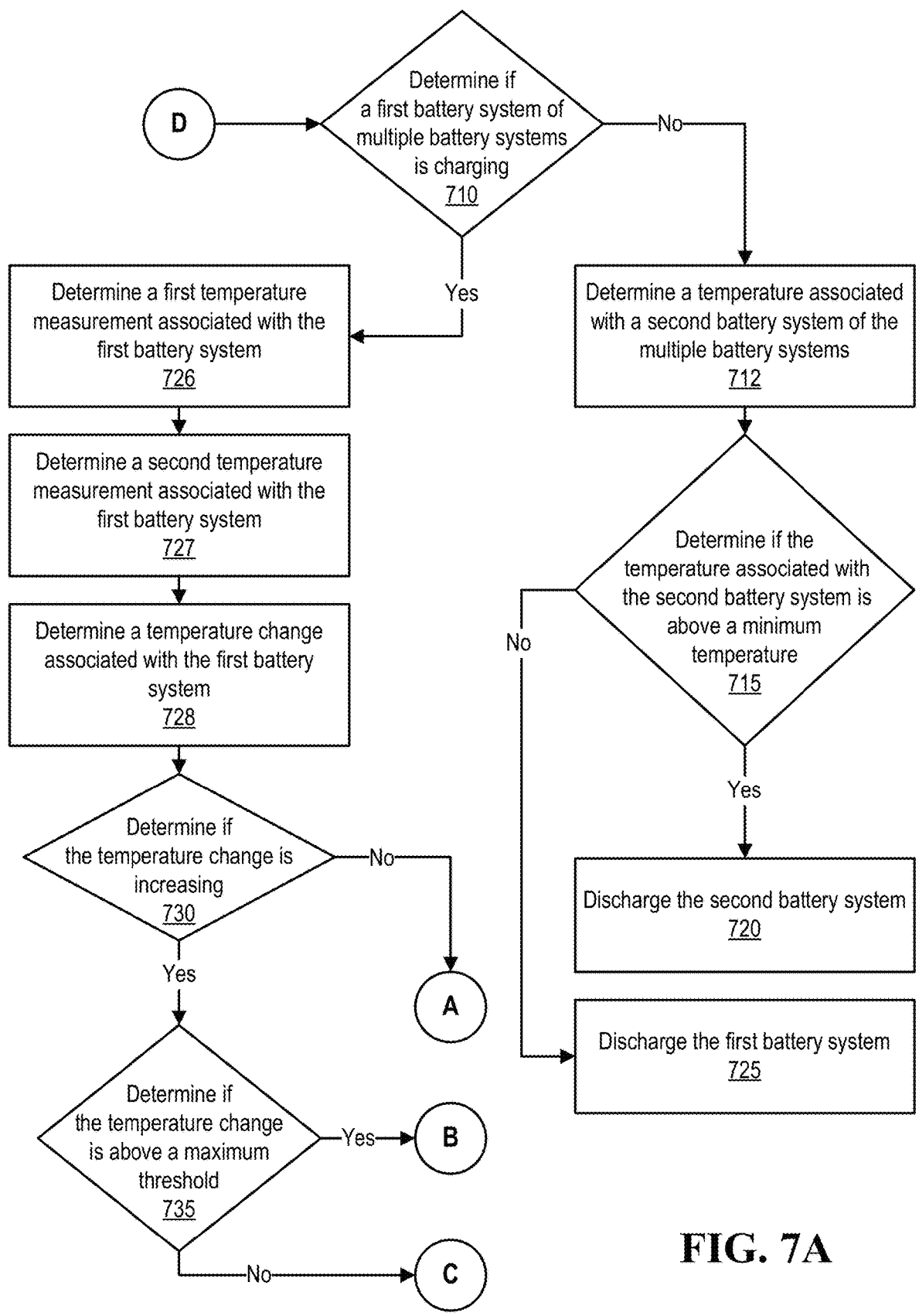
FIGS. 7A and 7B illustrate an example of a method of operating battery systems, according to one or more embodiments.
Figure 7B:
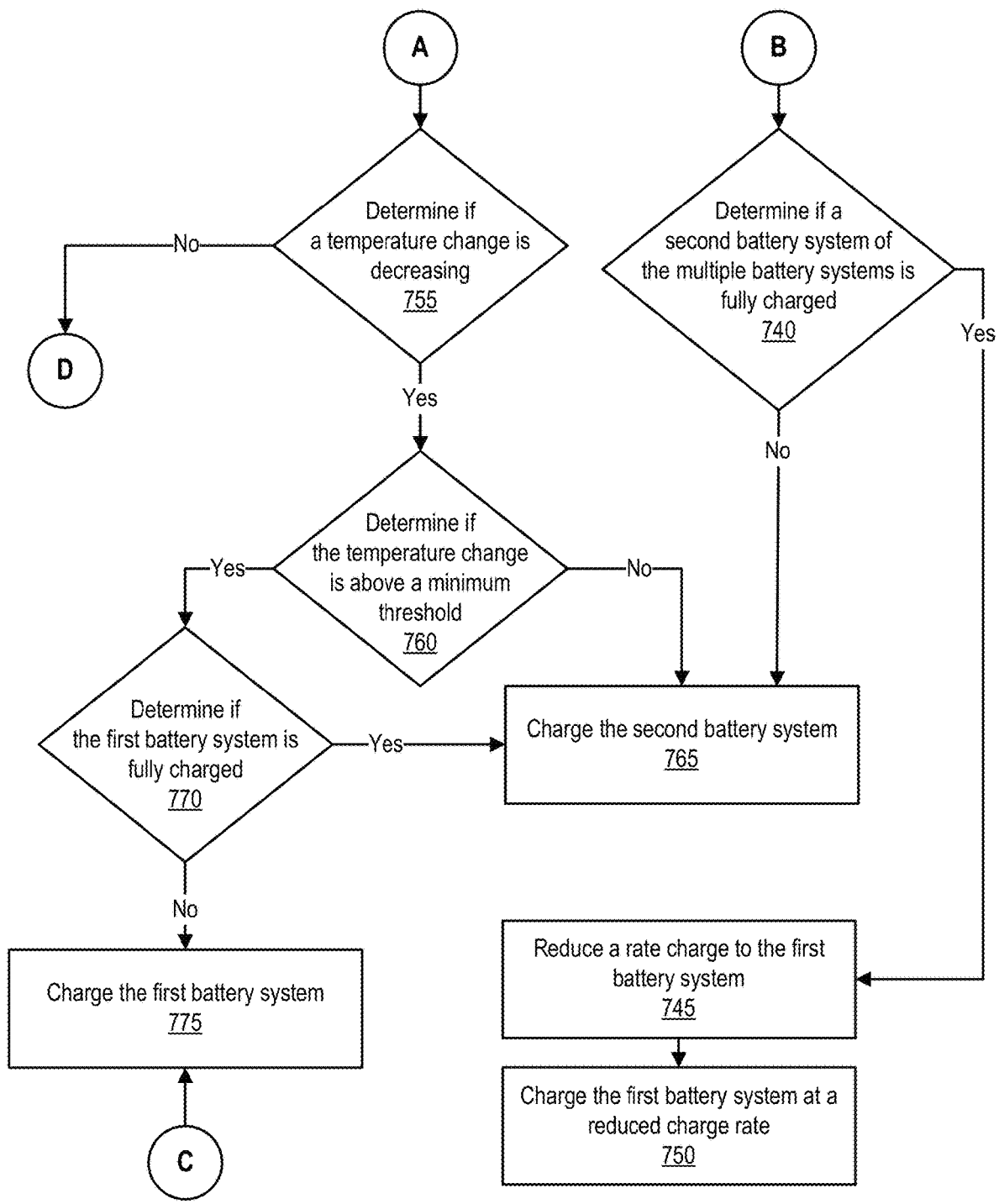

Turning now to FIGS. 7A and 7B, an example of a method of operating battery systems is illustrated, according to one or more embodiments. At 710, it may be determined if a first battery system of multiple battery systems, associated with a first portion of multiple portions of an information handling system, is being charged. If the first battery system is not being charged, a temperature associated with a second battery system, of the multiple battery systems of a second portion of the multiple portions of the information handling system, may be determined, at 712. At 715, it may be determined if the temperature associated with the second battery systems is above a minimum temperature. For example, the first battery may be battery system 310B. In one instance, the second battery system may be battery system 310F, associated with housing 210B (e.g., a second portion of IHS 110). In another instance, the second battery system may be battery system 310C, associated with portion 320C. In one or more embodiments, the second portion of the information handling system may be associated with a temperature that is less than a temperature associated with the first portion of the information handling system. For example, it may be determined that second portion of the information handling system is associated with a temperature that is less than a temperature associated with the first portion of the information handling system.

If the temperature associated with the second battery system is above the minimum temperature, the second battery may be discharged, at 720. For example, discharging the second battery system may include the second battery system providing power to one or more components of the information handling system. If the temperature associated with the second battery system is not above the minimum temperature, the first battery system may be discharged, at 725. For example, discharging the first system battery may include the first battery system providing power to one or more components of the information handling system.

If the first battery system is being charged, a first temperature measurement associated with the first battery system may be determined, at 726. At 727, a second temperature measurement associated with the first battery system may be determined. In one or more embodiments, the second temperature measurement associated with the first battery system may be determined after a period of time transpires. At 728, a temperature change, from the first temperature measurement associated with the first battery system and the second temperature measurement associated with the first battery system, may be determined. In one or more embodiments, determining a temperature change, from the first temperature measurement associated with the first battery system and the second temperature measurement associated with the first battery system, may include comparing the first temperature measurement associated with the first battery system and the second temperature measurement associated with the first battery system. For example, comparing the first temperature measurement associated with the first battery system and the second temperature measurement associated with the first battery system may include subtracting the first temperature measurement associated with the first battery system from the second temperature measurement associated with the first battery system. In one instance, if subtracting the first temperature measurement associated with the first battery system from the second temperature measurement associated with the first battery system produces a non-zero and positive number, the temperature of the first battery system may be increasing. In another instance, if subtracting the first temperature measurement associated with the first battery system from the second temperature measurement associated with the first battery system produces a non-zero and negative number, the temperature of the first battery system may be decreasing.

In one or more embodiments, sensor 196A may determine the first temperature measurement associated with the first battery system and the second temperature measurement associated with the first battery system. In one example, sensor 196A may be proximate to the first battery system. In a second example, sensor 196A may be in contact with the first battery system. In a third example, the first battery system may include sensor 196A. In fourth example, housing 210A (e.g., a first portion of IHS 110) may include battery system 310B (e.g., the firth battery system) and sensor 196A. In another example, portion 320B (e.g., a first portion of IHS 110) may include battery system 310B (e.g., the firth battery system) and sensor 196A.

At 730, it may be determined if the temperature change associated with the first battery system is increasing. If the temperature change associated with the first battery system is increasing, it may be determined if the temperature change is above a maximum threshold, at 735. If the temperature change is not above the maximum threshold, the first battery system may be charged, at 775. If the temperature change is above the maximum threshold, it may be determined if the second battery system is fully charged, at 740. If the second battery system is not fully charged, the second battery system may be charged at 765. If the second battery system is fully charged, a rate of charge to the first battery system may be reduced, at 745. At 750, the first battery system may be charged at a reduced rate.

If a temperature change associated with the first battery system is not increasing, it may be determined if temperature change associated with the first battery system is decreasing, at 755. If temperature change associated with the first battery system is not decreasing, the method may proceed to 710, according to one or more embodiments. If temperature change associated with the first battery system is decreasing, it may be determined if the temperature change associated with the first battery system is above a minimum threshold, at 760. If the temperature change associated with the first battery system is not above the minimum threshold, the second battery system may be charged, at 765.

If the temperature change associated with the first battery system is above the minimum threshold, it may be determined if the first battery system is fully charged, at 770. If the first battery system is fully charged, the second battery system may be charged, at 765. If the first battery system is not fully charged, the first battery system may be charged, at 775. In one or more embodiments, determining if the temperature change is above the minimum threshold may provide a shield against and/or provide mitigation from frequent shifting between charging the first battery system and charging the second battery system.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, configured to be readily carried by a user, comprising:
   at least one processor;
   a plurality of battery systems of a respective plurality of portions of the information handling system; and
   a memory medium, coupled to the at least one processor, that stores instructions executable by the at least one processor, which when executed by the at least one processor, cause the information handling system to:
      determine that a first battery system of the plurality of battery systems is charging;

determine a first temperature measurement associated with the first battery system;
after a period of time transpires, determine a second temperature measurement associated with the first battery system;
determine, from the first temperature measurement and the second temperature measurement, a temperature change associated with the first battery system;
determine if the temperature change is increasing;
if the temperature change is increasing:
determine if the temperature change is above a maximum threshold;
if the temperature change is not above the maximum threshold, charge the first battery system; and
if the temperature change is above the maximum threshold:
determine that a second battery system of the plurality of battery systems is fully charged; and
charge the first battery system at a reduced charge rate; and
if the temperature change is not increasing:
determine if the temperature change is above a minimum threshold;
if the temperature change is above the minimum threshold, charge the first battery; and
if the temperature change is not above the minimum threshold, charge the second battery system.

2. The information handling system of claim 1, further comprising:
a first housing; and
a second housing;
wherein a first portion the plurality of portions of the information handling system includes the first battery system;
wherein a second portion of the plurality of portions of the information handling system includes the second battery system;
wherein the first housing includes the first portion of the information handling system; and
wherein the second housing includes the second portion of the information handling system.

3. The information handling system of claim 1, further comprising:
an embedded controller; and
a sensor coupled to the embedded controller;
wherein the sensor is configured to provide the first temperature measurement and the second temperature measurement to the embedded controller.

4. The information handling system of claim 3, wherein the sensor is proximate to the first battery system, in contact with the first battery system, or included by the first battery system.

5. The information handling system of claim 1, further comprising:
a plurality of displays; and
a plurality of housings; and
wherein each of the plurality of housings includes a respective display of the plurality of displays; and
wherein each of the plurality of housings includes a respective portion of the plurality of portions of the information handling system.

6. The information handling system of claim 1, wherein the instructions further cause the information handling system to:
determine that the first battery system is not charging;
determine a temperature associated with the second battery system;
determine if the temperature associated with the second battery system is above a minimum temperature;
if the temperature associated with the second battery system is above the minimum temperature, permit the second battery system to provide power to one or more components of the information handling system; and
if the temperature associated with the second battery system is not above the minimum temperature, permit the first battery system to provide power to the one or more components of the information handling system.

7. The information handling system of claim 1, wherein the instructions further cause the information handling system to:
determine the reduced charge rate based at least on the temperature change and the second temperature measurement.

8. A method, comprising:
determining that a first battery system of a plurality of battery systems, of a respective plurality of portions of an information handling system that is configured to be readily carried by a user, is charging;
determining a first temperature measurement associated with the first battery system;
after a period of time transpires, determining a second temperature measurement associated with the first battery system;
determining, from the first temperature measurement and the second temperature measurement, a temperature change associated with the first battery system;
determining if the temperature change is increasing;
if the temperature change is increasing:
determining if the temperature change is above a maximum threshold;
if the temperature change is not above the maximum threshold, charging the first battery system; and
if the temperature change is above the maximum threshold:
determining that a second battery system of the plurality of battery systems is fully charged; and
charging the first battery system at a reduced charge rate; and
if the temperature change is not increasing:
determining if the temperature change is above a minimum threshold;
if the temperature change is above the minimum threshold, charging the first battery; and
if the temperature change is not above the minimum threshold, charging the second battery system.

9. The method of claim 8,
wherein a first portion of the information handling system of the plurality of portions of the information handling system includes the first battery system;
wherein a second portion of the information handling system of the plurality of portions of the information handling system includes the second battery system;
wherein a first housing of the information handling system includes the first portion of the information handling system; and
wherein a second housing of the information handling system includes the second portion of the information handling system.

10. The method of claim 8, further comprising:
a sensor providing the first temperature measurement and the second temperature measurement to an embedded controller of the information handling system.

11. The method of claim 10, wherein the sensor is proximate to the first battery system, in contact with the first battery system, or included by the first battery system.

12. The method of claim 8,
wherein the information handling system includes a plurality of displays;
wherein the information handling system includes a plurality of housings; and
wherein each of the plurality of housings includes a respective display of the plurality of displays.

13. The method of claim 8, further comprising:
determining that the first battery system is not charging;
determining a temperature associated with the second battery system;
determining if the temperature associated with the second battery system is above a minimum temperature;
if the temperature associated with the second battery system is above the minimum temperature, permitting the second battery system to provide power to one or more components of the information handling system; and
if the temperature associated with the second battery system is not above the minimum temperature, permitting the first battery system to provide power to the one or more components of the information handling system.

14. The method of claim 8, further comprising:
determining the reduced charge rate based at least on the temperature change and the second temperature measurement.

15. A computer-readable non-transitory memory medium that includes instructions that, when executed by at least one processor of an information handling system, cause the information handling system to:
determine that a first battery system of a plurality of battery systems, of a respective plurality of portions of the information handling system, is charging;
determine a first temperature measurement associated with the first battery system;
after a period of time transpires, determine a second temperature measurement associated with the first battery system;
determine, from the first temperature measurement and the second temperature measurement, a temperature change associated with the first battery system;
determine if the temperature change is increasing;
if the temperature change is increasing:
  determine if the temperature change is above a maximum threshold;
  if the temperature change is not above the maximum threshold, charge the first battery system; and
  if the temperature change is above the maximum threshold:
    determine that a second battery system of the plurality of battery systems is fully charged; and
    charge the first battery system at a reduced charge rate; and
if the temperature change is not increasing:
  determine if the temperature change is above a minimum threshold;
  if the temperature change is above the minimum threshold, charge the first battery; and
  if the temperature change is not above the minimum threshold, charge the second battery system.

16. The computer-readable non-transitory memory medium of claim 15,
wherein a first portion of the information handling system of the plurality of portions of the information handling system includes the first battery system;
wherein a second portion of the information handling system of the plurality of portions of the information handling system includes the second battery system;
wherein a first housing of the information handling system includes the first portion of the information handling system; and
wherein a second housing of the information handling system includes the second portion of the information handling system.

17. The computer-readable non-transitory memory medium of claim 15, wherein the instructions further cause the information handling system to:
receive the first temperature measurement and the second temperature measurement form a sensor.

18. The information handling system of claim 17, wherein the sensor is proximate to the first battery system, in contact with the first battery system, or included by the first battery system.

19. The computer-readable non-transitory memory medium of claim 15, wherein the instructions further cause the information handling system to:
determine that the first battery system is not charging;
determine a temperature associated with the second battery system;
determine if the temperature associated with the second battery system is above a minimum temperature;
if the temperature associated with the second battery system is above the minimum temperature, permit the second battery system to provide power to one or more components of the information handling system; and
if the temperature associated with the second battery system is not above the minimum temperature, permit the first battery system to provide power to the one or more components of the information handling system.

20. The computer-readable non-transitory memory medium of claim 15, wherein the instructions further cause the information handling system to:
determine the reduced charge rate based at least on the temperature change and the second temperature measurement.

* * * * *